Feb. 21, 1956  I. KALIKOW  2,735,734
BEARING MOUNTING
Filed March 23, 1954
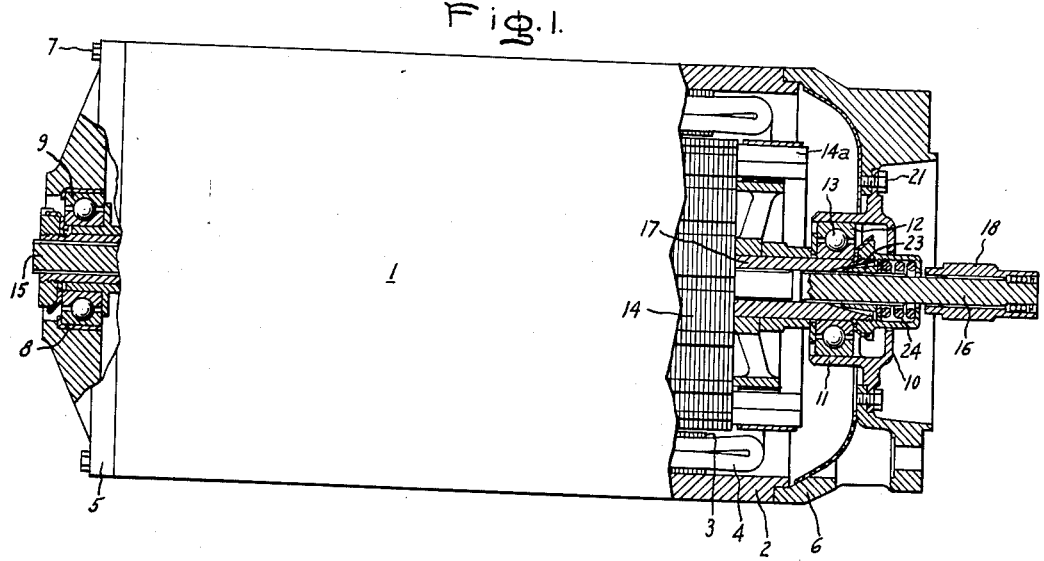
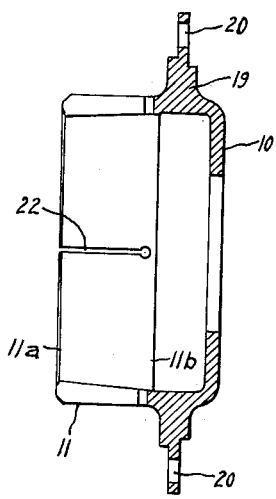
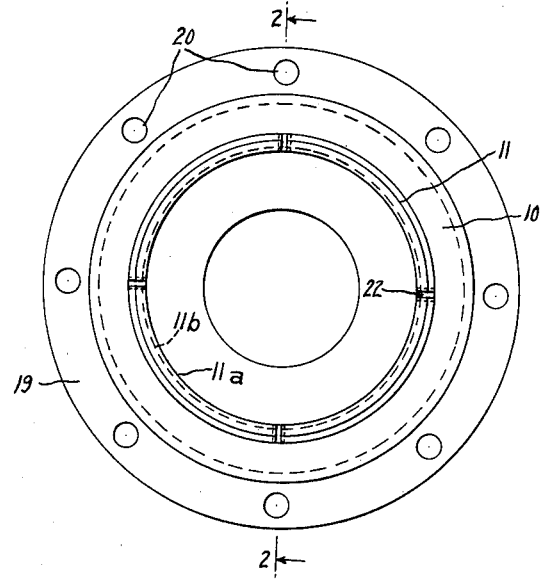
Inventor:
Irving Kalikow,
by Claude A. Mott
His Attorney.

United States Patent Office 2,735,734
Patented Feb. 21, 1956

2,735,734

BEARING MOUNTING

Irving Kalikow, Swampscott, Mass., assignor to General Electric Company, a corporation of New York Application March 23, 1954, Serial No. 418,148

3 Claims. (Cl. 308—189)

My invention relates to improved bearing construction which may be used generally in connection with roller or ball bearings and is particularly adapted for use in mounting anti-friction bearings for dynamoelectric machines and high speed machine arbors.

In machines wherein a rotating shaft is supported in bearings having a fixed distance therebetween, provision must be made to compensate for the difference in axial expansion of the shaft and the bearing supporting housing or frame due to difference of temperature rise thereof during the operation of the unit. In an electric generator, for example, the shaft becomes hotter than the housing and means must be provided to permit the axial movement of at least one of the bearings to prevent destructive axial loading from being placed on the bearings. Heretofore, this problem has been solved by utilizing resilient sleeves or circumferential springs surrounding the bearing outer race within the bearing housing hub. This arrangement, however, requires that the outer race be axially slidable within the bearing housing seat so that the bearing is not tightly secured against rotation. In such constructions, creep rotation of the outer race in its bearing seat, characterized by high unit pressures and minute motions, are encountered especially where there are high vibration forces.

Creep rotation results in objectionable noises and vibrations as well as in fretting corrosion which greatly increase the wear of the bearing seat requiring replacement, and produces non-uniformity of the air gap to aggravate the side pull of any unequal flux distortion in the air gap resulting from necessary machining tolerances.

Another solution to the problem of differential axial expansion between the shaft and the bearing housing has required the special gaging of the diameters of the machined bearing seat and selecting a bearing to be used therewith such that there is an interference fit of 0.0001" to 0.0002". Such an interference fit causes the bearing outer race to be gripped tightly so that creep rotation thereof with respect to its seat is prevented while permitting the axial movement of the bearing to provide for shaft expansion under the influence of an axial force of substantially less than the maximum thrust capacity of the bearing. Not only does this method require the precise machining and gaging of each bearing seat and bearing, but it also requires the size coding of each bearing and seat to destroy the interchangeability of bearings of slightly different diameters thus creating a replacement problem.

My invention contemplates a solution to the above-identified difficulties by providing a construction wherein the outer bearing race is securely constrained from rotation and yet will provide for the unequal axial expansion of the shaft and the bearing housing. Further, my invention contemplates such a construction wherein precise matching of bearings and bearing seats is eliminated, and interchangeability of bearings of the same nominal size is obtained.

Accordingly, it is an object of my invention to provide a bearing construction wherein axial movement of the bearing is permitted and all rotational movement of the outer race of the bearing is prevented.

A second object of my invention is to provide a bearing structure wherein a substantially uniform radial pressure against the bearing outer race prevents its rotation.

A still further object of my invention is to provide a bearing housing construction which permits the axial movement of the bearing while providing for the rigid support of a bearing operating under high vibrational conditions.

Further objects and advantages of my invention will become apparent and my invention will be better understood by reference to the accompanying drawing and description, and the features of novelty which characterize my invention will be pointed out with particularity in the claims annexed to and forming part of this specification.

In the drawing, Figure 1 illustrates a dynamoelectric machine, partly in section, which incorporates my invention.

Figure 2 is an enlarged sectional view of the improved bearing housing construction of my invention taken along the line 2—2 of Figure 3.

Figure 3 is an end view of the bearing housing construction of my invention.

In accordance with the illustrated embodiment of my invention, I provide a bearing housing arrangement wherein the bearing housing member has substantial thickness and the bearing receiving pocket therein is provided with an inverse taper. The dimensions of the bearing receiving pocket are such that the bearing outer race is inserted therein by means of a press fit. The cylindrical wall of the bearing receiving pocket is split into a number of annular segments to provide for their expansion when the bearing is inserted. These annular segments serve as rigid cantilever spring members to restrain the bearing outer race against rotation but permit its axial movement. The thickness of the walls of the bearing hub as well as the amount of taper and the number of annular segments may be varied in order to provide a radial force of the desired amount.

In the drawing, there is shown one practical embodiment of my present invention wherein an electric generator 1 having a cylindrical shell member 2 to which a stator core 3 having exciting windings 4 is firmly secured. A pair of end shields 5 and 6 are rabbeted to shell member 2 in a usual manner and are secured thereto by any suitable means such as bolts 7. End shield 5 provides a bearing housing 8 in which an anti-friction bearing 9 is positioned. End shield 6 is provided with an annular bearing cap 10 which in turn provides a bearing hub 11 for housing the bearing outer race 12 of bearing 13. The construction of bearing cap 10 will hereinafter be more fully described.

Concentrically located within stator member 3 is a rotor 14 which is shown as being provided with windings 14a, whereby it cooperates electrodynamically with the stator member 3. Rotor 14 is mounted to rotate with a composite shaft 15 having an interior resilient torque rod 16 and an outer quill shaft 17 to which the rotor punchings are secured. An adapter 18 is loosely splined at one end of torque rod 16 to provide a driving connection having a torsional clearance with the device to which generator 1 is coupled to limit the amplitude of the vibratory oscillations of rotor 14 during operation. An axially slidable cone-shaped friction member 23 splined to rotate with torque rod 16, is biased into engagement with quill shaft 17 in a mating cone-shaped recess by a compression spring 24. This construction serves to limit the violent oscillatory excursion of rotor 14 occasionally occurring during transient conditions such as the backfiring of the prime mover by which generator 1 is driven. The opposite end of the torque rod 16 is shown as being connected to the quill shaft 17 by any suitable means such as splines.

Referring now particularly to Fig. 2, it will be noted that bearing cap 10 is provided with a rigid concentric annular supporting means such as radial wall 19 of substantial thickness so as to be substantially unyielding upon the application of either radial or axial forces of the magnitudes present in the generator. Cap 10 is shown as being provided with apertures 20 to receive bolts 21 for securing the bearing cap 10 to end shield 6. The rigid construction of bearing cap 10 assures the retention of a uniform air gap even under the stress of heavy vibrational forces.

In order to secure the outer race of the bearing against rotation while providing for the thermal expansion of shaft 15, cap 10 is provided with a bearing receiving hub 11 which is generally cylindrical in cross section. The walls of hub 11 have a substantial thickness so as to be relatively inflexible. In the preferred design, the thickness of these walls is approximately the thickness of the bearing outer race. A plurality of axially extending slots 22 (here illustrated as being 4 in number) split the walls of hub 11 into a plurality of arcuate segments which are cantilever mounted on the wall 19 of bearing cap 10. The inner surface of hub 11 is provided with a slight inverse taper of the order of .001" to .002" per inch axially along the inner surface of hub 11 so that the inner diameter of the hub is greater at the end 11b than at the end 11a. The taper of the inner surface of hub 11 is exaggerated as shown in Fig. 2 for clarity of illustration.

In the practice of my invention, the diameter of the pocket at 11b is of a size to provide an interference fit of from 0.0001" to 0.0002" with the largest bearing to be placed therein. With the provision of such an interference fit at 11b and the use of the inverse taper described above, hub 11 will engage and secure any bearing within the manufacturing tolerance of a nominal size with a substantially uniform radial force approximately equal to the force of an unsegmented, non-tapered hub engaging each of the bearings with a 0.0001" to 0.0002" interference fit, thereby providing a large degree of interchangeability.

It is apparent that by changing the wall thickness of the hub, the number of arcuate segments into which it is split and the amount of taper, it is possible to produce the desired restraining force for any particular application. The precise combination of these three variables is determined by the design factors involved, including the maximum thrust load the particular bearing can support. It is preferable, however, to utilize a small taper with a small number of segments since such a construction provides great strength with minimum distortion of the metal of the hub.

It is apparent that the bearing mounting construction, which has been shown herein as being used on one end of the machine only, could also be used to support both bearings of the machine. Moreover, it is obvious that the wall 19 of the bearing cap 10 could be formed as an integral part of the end shield 6 since this construction would produce the required strength and rigidity of the cantilever support of the arcuate segments of the bearing hub. This rigidity is essential in order to maintain a constant air gap and to stabilize the output of the machine, especially under conditions of high vibrational stress.

While I have illustrated and described a particular embodiment of this invention, further modifications and improvements thereof will occur to those skilled in the art. I desire it to be understood, therefore, that this invention is not to be limited to the specific embodiment shown and I intend in the appended claims to cover all modifications thereof which do not depart from the spirit and scope of this invention.

What I claim as new and desire to secure by Letters Patent of the United States is:

1. An anti-friction bearing mounting for a shaft subjected to high vibration forces tending to cause creep rotation of the bearing and subjected to expansion and contraction causing axial movement of the bearing, comprising an anti-friction bearing having a nominal diameter within manufacturing tolerances, an annular supporting hub for said bearing having a wall of substantial thickness split axially at one end to form a plurality of rigid arcuate segments engaging the outer surface of said bearing, the inner cylindrical surface of said hub having an inverse taper with a diameter at its largest end being from .0001" to .0002" smaller than the diameter of the largest bearing of said nominal diameter so that said segments tightly engage said bearing to secure it against creep rotation while providing for axial movement of said bearing by expansion or contraction of said shaft without destructive axial loading thereof.

2. An anti-friction bearing mounting for a shaft subjected to high vibration forces tending to cause creep rotation of the bearing and subjected to expansion and contraction causing axial movement of the bearing, comprising an anti-friction bearing having a nominal diameter within manufacturing tolerances, an annular supporting hub for said bearing having a wall of substantial thickness split axially at one end to form a plurality of rigid arcuate segments engaging the outer surface of said bearing, the inner cylindrical surface of said hub having an inverse taper of approximately .002" per inch with a diameter at its largest end being from .0001" to .0002" smaller than the diameter of the largest bearing of said nominal diameter so that said segments tightly engage said bearing to secure it against creep rotation while providing for axial movement of said bearing by expansion or contraction of said shaft without destructive axial loading thereof.

3. An anti-friction bearing mounting for a shaft subjected to high vibration forces tending to cause creep rotation of the bearing and subjected to expansion and contraction causing axial movement of the bearing, comprising an anti-friction bearing having a nominal diameter within manufacturing tolerances, an annular supporting hub for said bearing having a wall of substantial thickness split axially at one end to form a plurality of rigid arcuate segments engaging the outer surface of said bearing, the inner cylindrical surface of said hub having an inverse taper with its largest diameter being dimensioned to provide an interference fit with the largest bearing of said nominal diameter so that said segments tightly engage said bearing to secure it against creep rotation while providing for axial movement of said bearing by expansion or contraction of said shaft without destructive axial loading thereof.

References Cited in the file of this patent

UNITED STATES PATENTS

| | | |
|---|---|---|
| 2,162,977 | Searles | June 20, 1939 |
| 2,345,952 | Smith | Apr. 4, 1944 |
| 2,504,776 | Woodfield et al. | Apr. 18, 1950 |
| 2,521,638 | Lamm | Sept. 5, 1950 |